(12) United States Patent
Chai et al.

(10) Patent No.: US 10,071,645 B2
(45) Date of Patent: Sep. 11, 2018

(54) AUTONOMOUS VEHICLE CHARGING STATION CONNECTION

(71) Applicant: Faraday&Future Inc., Gardena, CA (US)

(72) Inventors: Boaz Jie Chai, Mountain View, CA (US); Anil Paryani, Cerritos, CA (US); Eahab Nagi El Naga, Topanga, CA (US); William Alan Beverley, Lakewood, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/017,491

(22) Filed: Feb. 5, 2016

(65) Prior Publication Data

US 2017/0225583 A1    Aug. 10, 2017

(51) Int. Cl.
   *B60L 11/18*    (2006.01)
(52) U.S. Cl.
   CPC ....... *B60L 11/1833* (2013.01); *B60L 11/1816* (2013.01); *B60L 11/1835* (2013.01); *B60L 2230/10* (2013.01); *B60L 2240/622* (2013.01); *B60L 2260/32* (2013.01)
(58) Field of Classification Search
   CPC ............. B60L 11/1833; B60L 11/1816; B60L 11/1835; B60L 2260/32; B60L 2240/622; B60L 2230/10
   USPC .......................... 701/22; 320/109; 180/65.29
   See application file for complete search history.

(56) References Cited

U.S. PATENT DOCUMENTS

| | | |
|---|---|---|
| 5,879,833 A | 3/1999 | Yoshii et al. |
| 6,194,854 B1 | 2/2001 | Uchibori |
| 7,999,506 B1 | 8/2011 | Hollar |
| 8,057,928 B2 | 11/2011 | Kohn et al. |
| 8,890,475 B1 * | 11/2014 | Becker ............... B60L 11/1827 180/65.29 |
| 9,056,555 B1 | 6/2015 | Zhou |
| 9,770,993 B2 | 9/2017 | Zhao |
| 2001/0046624 A1 | 11/2001 | Goto et al. |
| 2008/0138698 A1 | 6/2008 | Ogami et al. |
| 2009/0023059 A1 | 1/2009 | Kinoshita et al. |
| 2010/0047682 A1 | 2/2010 | Houchin-Miller et al. |
| 2010/0201309 A1 | 8/2010 | Meek |
| 2011/0077809 A1 | 3/2011 | Leary |
| 2011/0148350 A1 | 6/2011 | Wegener |
| 2012/0280656 A1 | 11/2012 | Bedell |
| 2013/0076902 A1 | 3/2013 | Gao |
| 2013/0193918 A1 * | 8/2013 | Sarkar ...................... B60L 3/04 320/109 |
| 2014/0354229 A1 | 12/2014 | Zhao |
| 2015/0042278 A1 | 2/2015 | Leary |
| 2015/0097529 A1 | 4/2015 | Lacour |

(Continued)

OTHER PUBLICATIONS

Non-Final Office Action, dated Dec. 31, 2015, U.S. Appl. No. 14/841,617, filed Aug. 31, 2015.

*Primary Examiner* — Nga X Nguyen
(74) *Attorney, Agent, or Firm* — Knobbe Martens Olson & Bear LLP

(57) ABSTRACT

A charging station can be autonomously coupled to an electric vehicle. Sensors on the vehicle determine a location of the vehicle, and the vehicle is positioned within a connection envelope. A travel path for bringing a charging connector into contact with a charging port on the vehicle can be determined, and then the travel path is autonomously carried out.

5 Claims, 13 Drawing Sheets

(56) References Cited

U.S. PATENT DOCUMENTS

2016/0332525 A1 11/2016 Kufner
2017/0008412 A1 1/2017 Wu
2017/0050526 A1 2/2017 Sommarstrom
2017/0166070 A1 6/2017 Dunger
2017/0166071 A1 6/2017 Tajima
2017/0210237 A1 7/2017 Buehs
2017/0291497 A1 10/2017 Daniel

* cited by examiner

AUTONOMOUS VEHICLE CHARGING STATION CONNECTION

FIELD OF THE DISCLOSURE

The present disclosure relates generally to the field of vehicle charging systems, and more specifically to autonomously connecting vehicle charging systems.

BACKGROUND

Battery powered electric vehicles require periodic recharging. A charging station can comprise an electrical cable delivering electricity from a power source, and a connector coupled to the cable. The connector can be coupled to a charging port on the car to deliver power to the batteries.

SUMMARY

The present disclosure is directed to methods for autonomous connection of a charging station to a vehicle. In an exemplary method, a first signal can be received from a first sensor on a vehicle. The signal can indicate a location of the vehicle. A first system controller can activate a self-driving mode of the vehicle, and direct movements of the vehicle using the self-driving mode to position a charging port on the vehicle within a connection envelope. A second signal can be received from a second sensor on a charging station indicating a location of the charging station. A second system controller can direct movements of the charging station to position a charging connector on the charging station in contact with the charging port within the connection envelope.

According to additional exemplary embodiments, the present disclosure can be directed to methods for autonomous connection of a charging station to a vehicle. In an exemplary method, a system controller can determine a location of a vehicle and a location of a charging station. The system controller can transmit over a network to an intelligent agent the locations of the vehicle and the charging station. The intelligent agent can determine a first travel path to reposition the vehicle such that a charging port on the vehicle is positioned within a connection envelope about the charging station. The intelligent agent can transmit over the network to the system controller the first travel path. The system controller can activate a self-driving mode of the vehicle and implement the first travel path to position the charging port within the connection envelope. The intelligent agent can determine a second travel path to reposition the charging station such that a charging connector on the charging station is in contact with the charging port within the connection envelope. The intelligent agent can transmit over the network to the system controller the second travel path. The system controller can activate movement of the charging station along the second travel path and position the charging connector in contact with the charging port within the connection envelope.

According to further exemplary embodiments, the present disclosure can be directed to systems for autonomous connection of a charging station to a vehicle. An exemplary system can comprise a vehicle comprising a charging port and a self-driving mode, and a first sensor on the vehicle to detect a location of the vehicle. The system can comprise a charging station comprising a charging connector and mechanisms to move the charging station along an x-axis, y-axis, and z-axis. The charging system can further comprise a second sensor on the charging station to detect a location of the charging station. A system controller can be communicatively coupled to the first sensor, the second sensor, the vehicle and the charging station. The system controller can be configured to activate the vehicle self-driving mode when the vehicle is in proximity to the charging station, cause the vehicle to move such that the charging port is within a connection envelope about the charging station, and cause the mechanisms to move the charging station such that the charging connector contacts the charging port within the connection envelope.

DETAILED DESCRIPTION

Battery powered electric vehicles (EVs) require periodic charging to replenish the charge on batteries. An EV charging station can be connected to an electric grid or other electricity generating device as a source of electric energy. Charging stations can comprise a standard residential 120 volt Alternating Current (AC) electrical socket that connects to the vehicle by a cable with a standard electrical plug at one end for connecting to the residential socket, and a vehicle-specific connector at the other end for connecting to the EV. Household chargers utilizing 240 volt AC can also be installed to reduce charging time. Commercial and government-operated charging stations can also utilize 120 volt and 240 volt AC, or can utilize a Direct Current (DC) Fast Charge system of up to 500 volts.

When the charging occurs outdoors (e.g., in the EV owner's driveway or at a public roadside or parking lot road station), weather conditions can make it difficult to connect the charger to the EV. During very cold periods, a driver can be wearing gloves making it difficult to access the charger, grab hold of the cable and connector, open an access door on the EV charging port, and connect the cable to the charging port. Similarly, rain and snow conditions can make the connection procedure undesirable. Even if the EV owner has a charging station within a home garage, space limitations and everyday clutter in the garage can make access to the charging station and EV charging port difficult and tedious. Time limitations can also make the connection procedure undesirable when the driver is in a hurry and does not have time to connect the charging station to the EV. A system that would automatically connect the charging station to the charging port would solve many of these problems.

Figure 1:
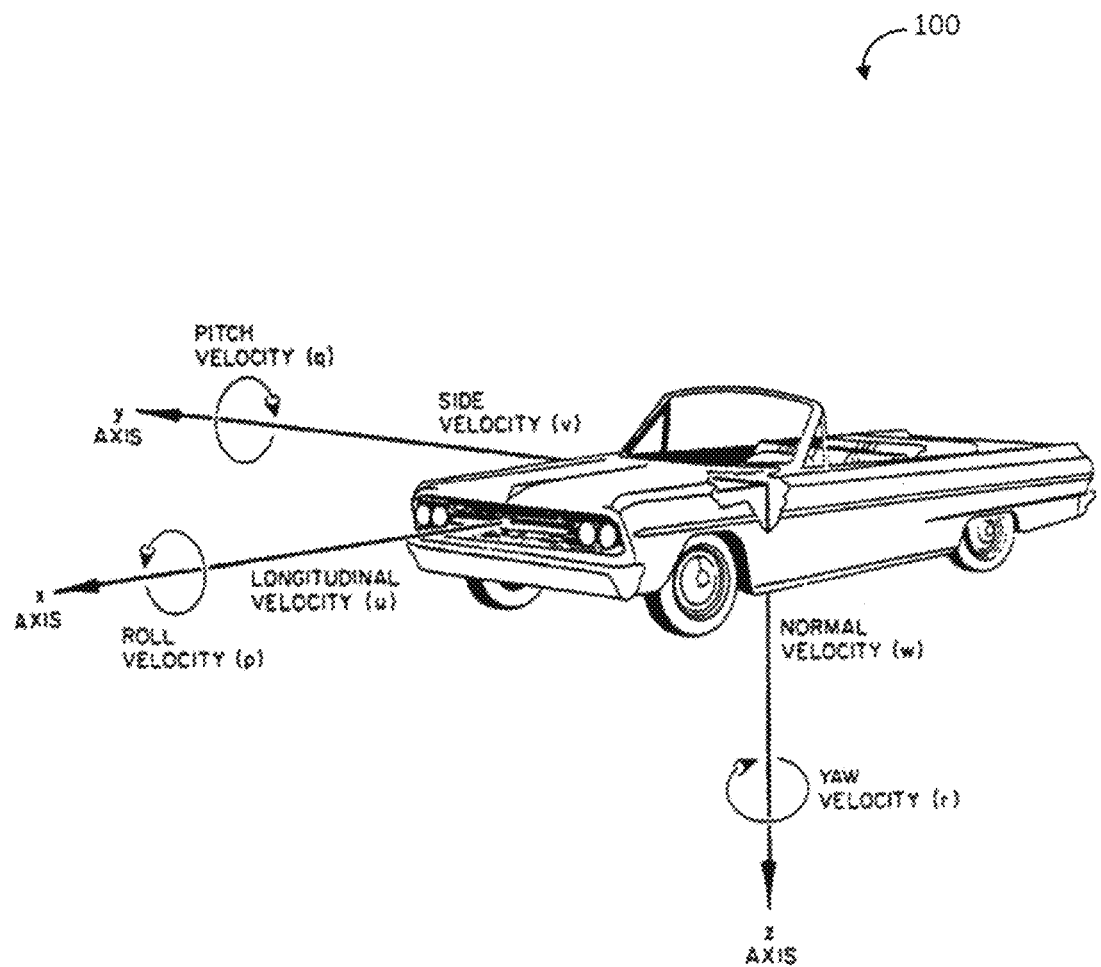
FIG. 1 is a perspective view of a vehicle and an x-axis, a y-axis and a z-axis of the vehicle according to various embodiments.

Various embodiments of an autonomous charging station can comprise movement in any direction within a 3-dimensional space defined by an x-axis, a y-axis, and a z-axis. For ease of reference and consistence throughout the present disclosure, FIG. 1 illustrates the orientation of the x-axis, y-axis, and z-axis with reference to a vehicle 100. The x-axis represents movement forward and backward along a direction of travel of the vehicle 100; the y-axis represents movement to the right and left normal to the direction of travel of the vehicle 100; and the z-axis represents movement up and down normal to the plane defined by the road surface (or other surface) on which the vehicle 100 travels.

Figure 2:
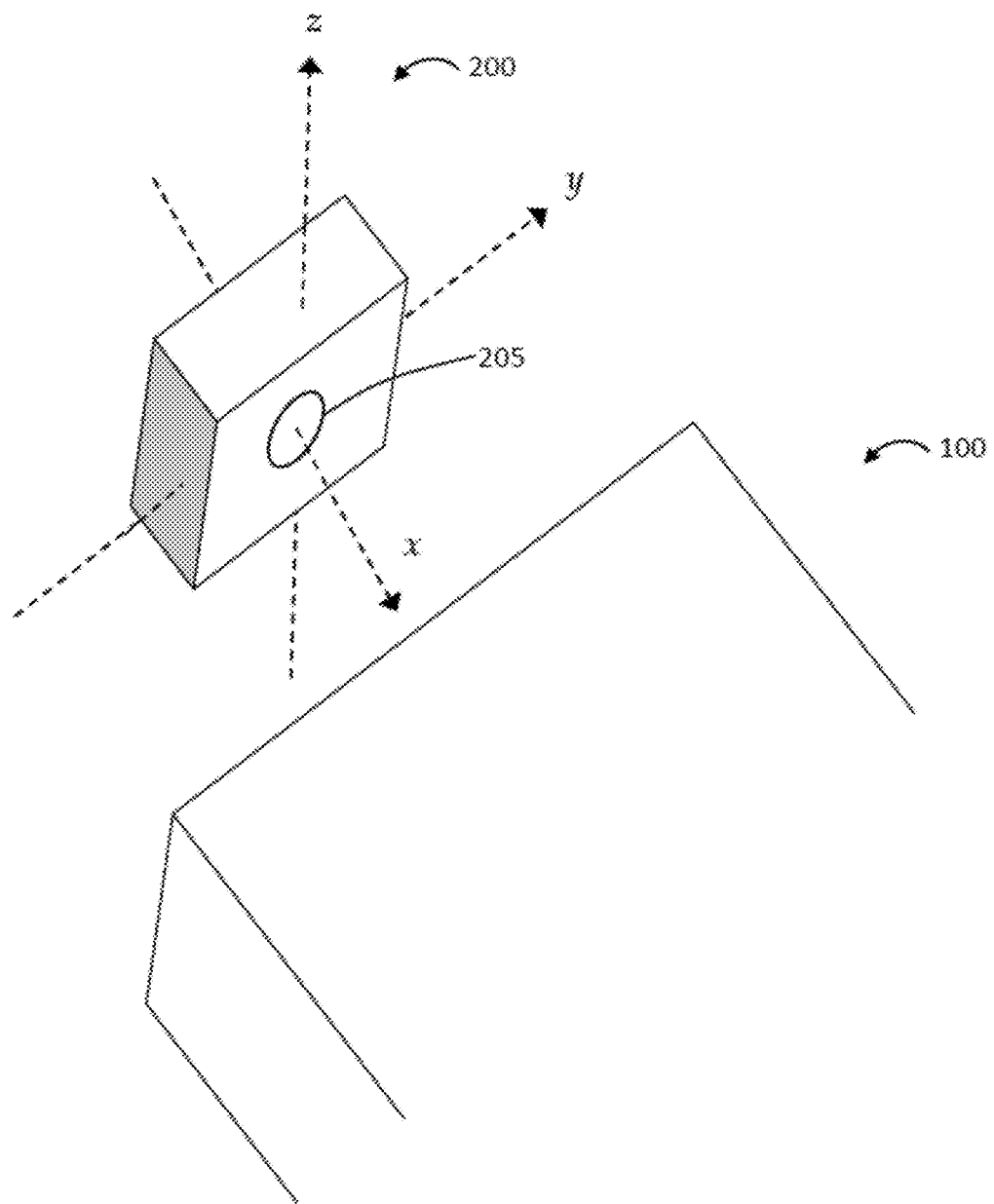
FIG. 2 is a schematic diagram of a vehicle in proximity to a charging station according to various embodiments.
Figure 3:
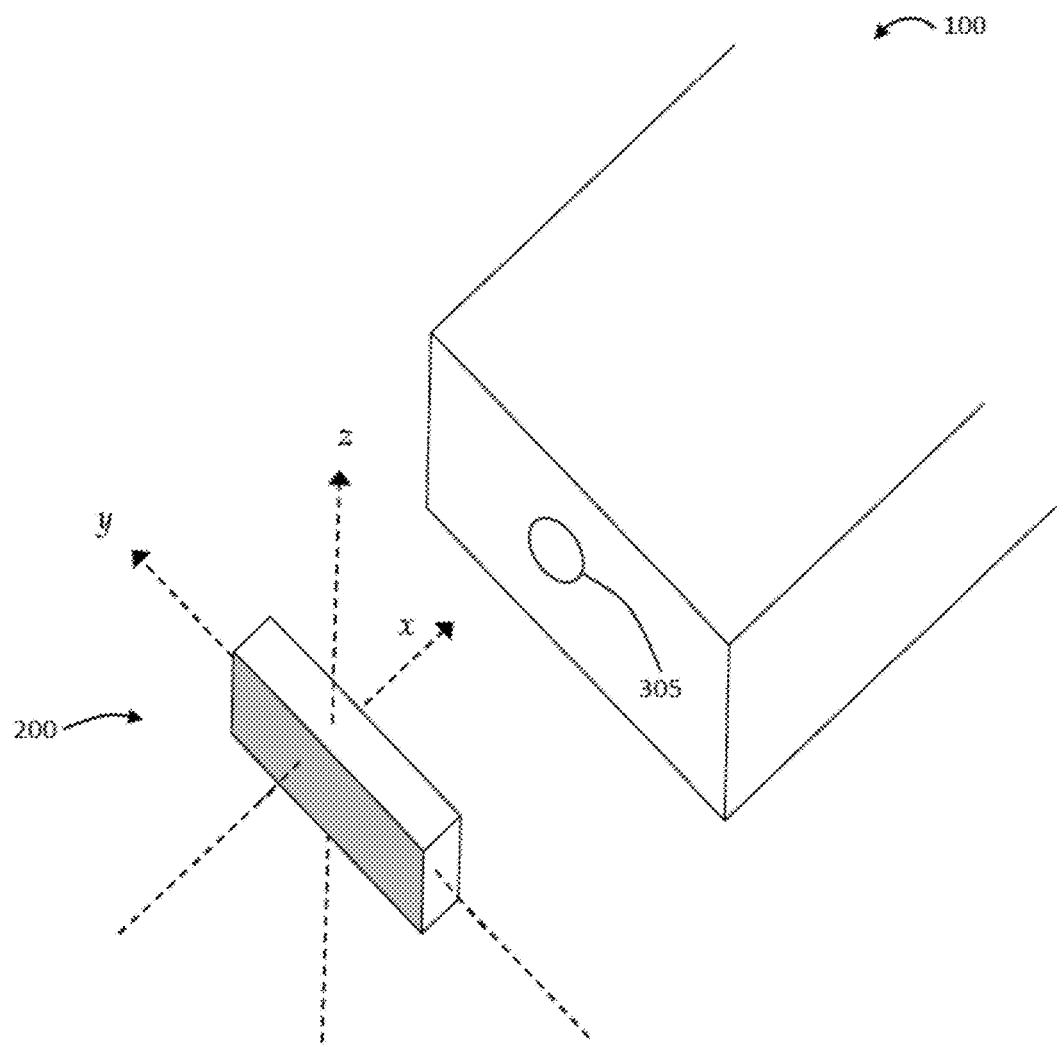
FIG. 3 is a further schematic diagram of a vehicle in proximity to a charging station according to various embodiments.

FIG. 2 schematically illustrates the vehicle 100 in proximity to a charging station 200 from the perspective of the rear of the vehicle 100, and FIG. 3 schematically illustrates the vehicle 100 and charging station 200 from the perspective of the front of the vehicle 100 according to various embodiments. The vehicle 100 can comprise a charging port 305, and the charging station 200 can comprise a charging connection 205. A desired result according to various embodiments can be to couple the charging connector 205 and the charging port 305, which can be accomplished by moving the charging connector 205 within the 3-dimensional space defined by the x-axis, y-axis and z-axis. The terms "front" and "rear" as used herein are merely descriptive and are not limiting in any way. It is not to be implied that the charging port 305 can be located only on the front or rear of the vehicle 100. In actual practice, the charging port 305 can be located at any point on or within the vehicle 100 and any such location is within the scope of the present disclosure.

Figure 4:
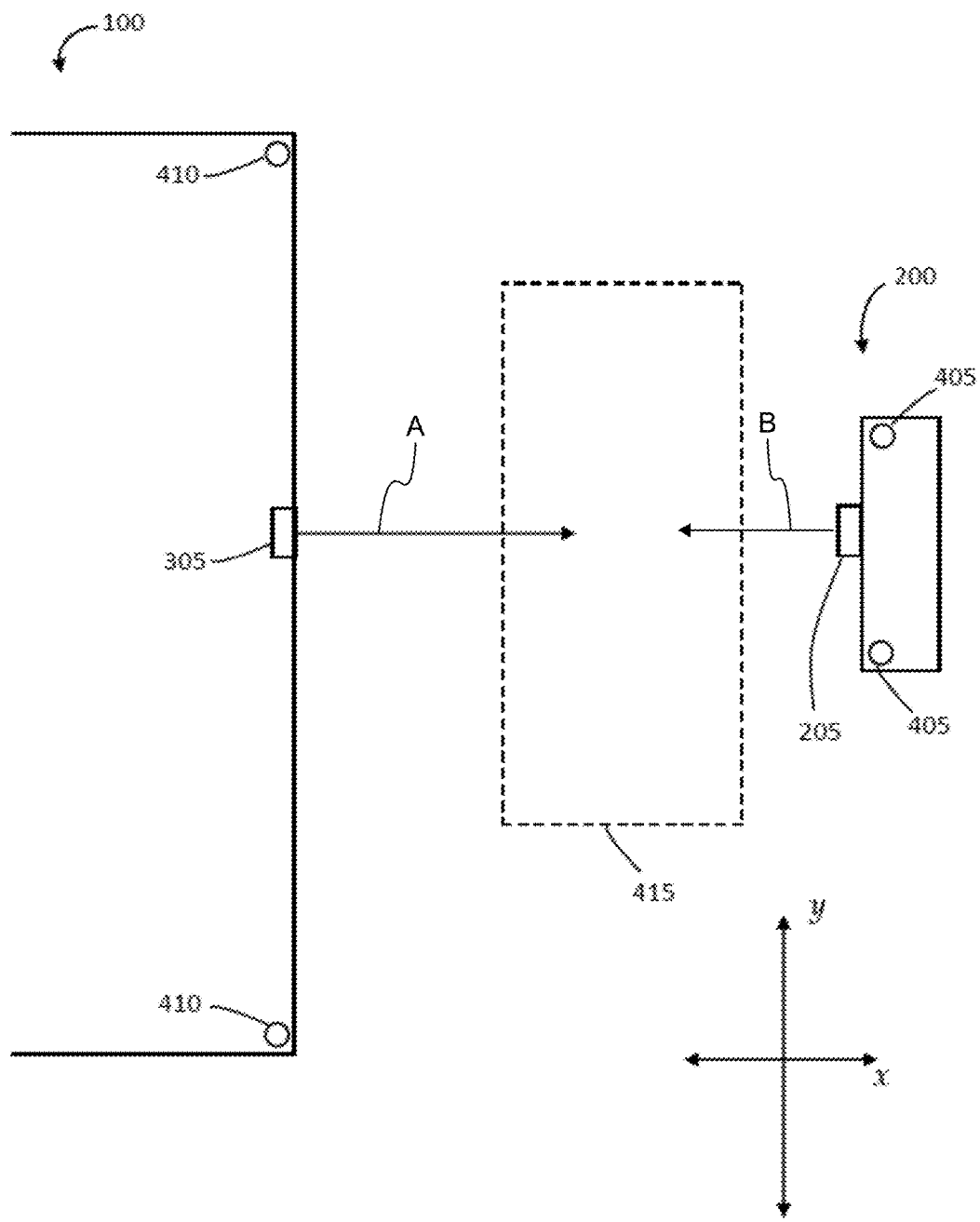
FIG. 4 is a schematic diagram of a top view of a connection envelope for connecting a charging station to a vehicle according to various embodiments.
Figure 5:
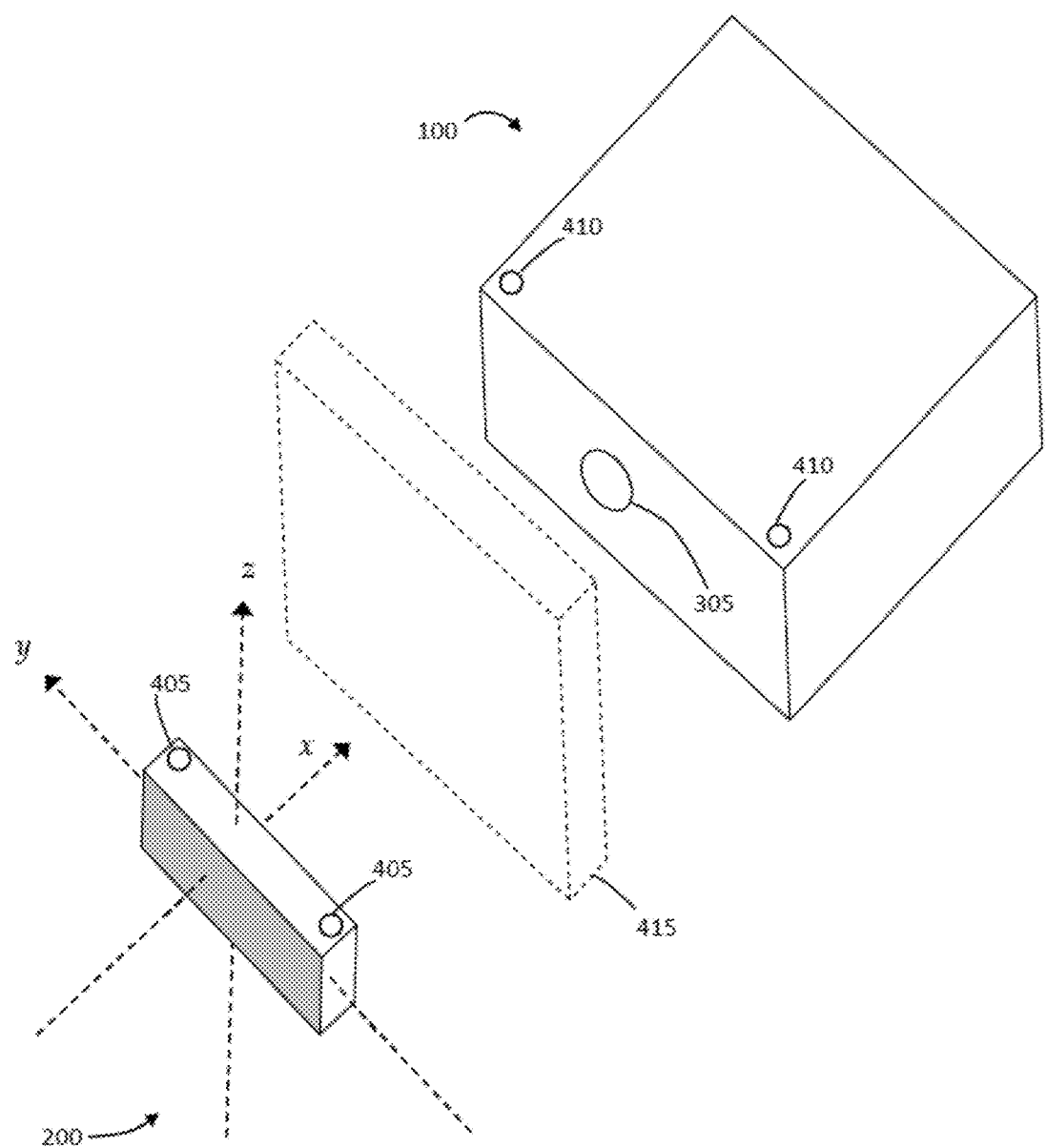
FIG. 5 is a perspective view of a connection envelope for connecting a charging station to a vehicle according to various embodiments.

In various embodiments, movement of the charging station 200 (or a portion of the charging station 200 comprising the charging connector 205) can be limited due to mechanical constraints. These limitations can define a connection envelope 415 as illustrated schematically in FIG. 4 according to various embodiments. In order for the charging connector 205 to couple with the charging port 305, the charging port 305 can be positioned within the connection envelope 415. FIG. 4 schematically illustrates an overhead view of the vehicle 100 and the charging station 200, and the connection envelope 415 therebetween. According to various embodiments, FIG. 5 schematically illustrates that the connection envelope 415 can be a 3-dimensional space. Although FIGS. 4 and 5 represent the connection envelope 415 as a rectangular block, the connection envelope 415 can be any shape, limited only by the mechanical movement constraints of the charging station 200. For example, the shape of the connection envelope 415 can be spherical, ovoid, curved, arched, and the like.

Figure 6:
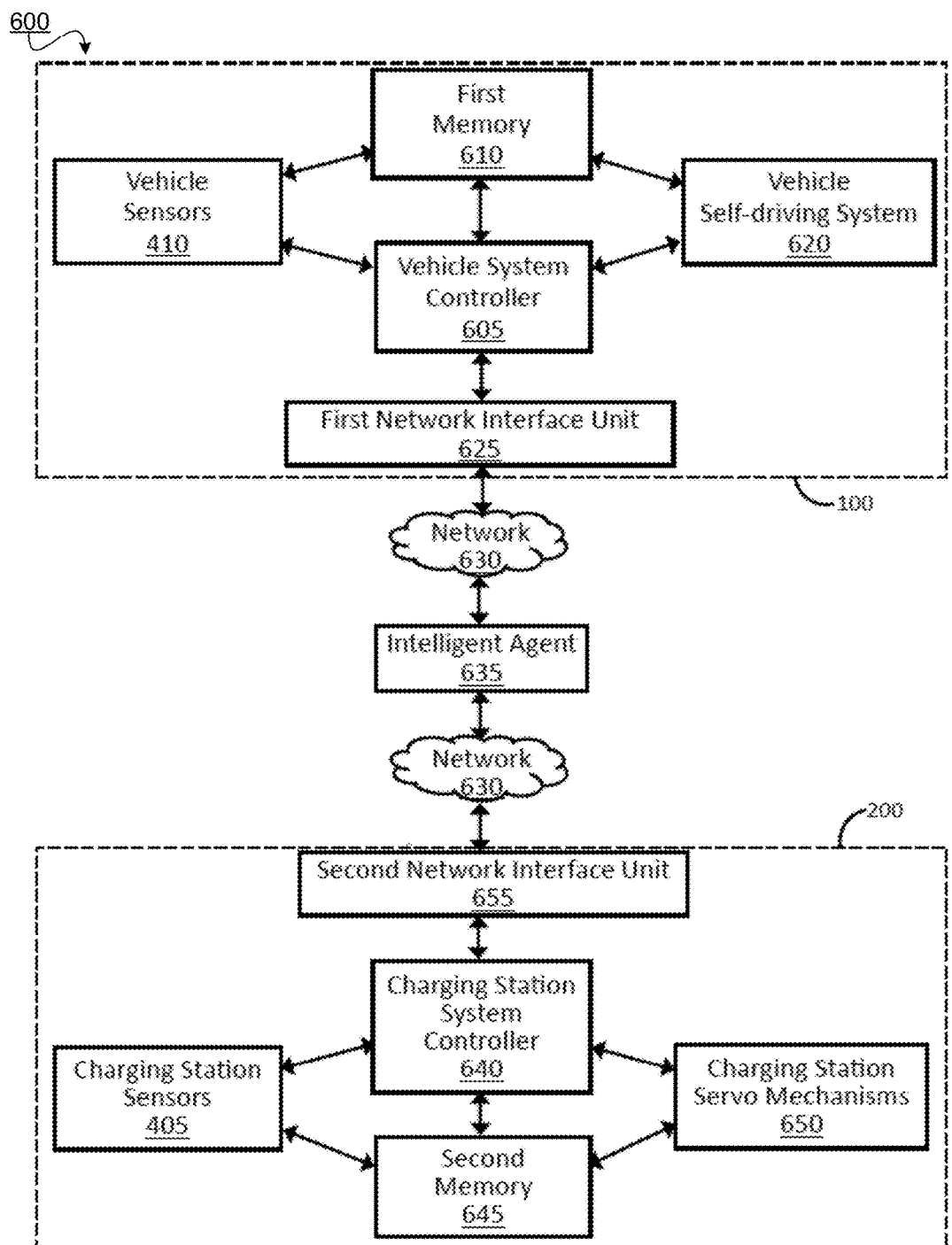
FIG. 6 is a schematic diagram of an exemplary system for autonomous connection of a charging station to a vehicle according to various embodiments.

Some embodiments, as illustrated in FIG. 6 along with FIGS. 1 through 5, can comprise an autonomous system 600 for coupling the charging station 200 to the vehicle 100. The vehicle 100 can comprise a vehicle system controller 605 communicatively coupled to a first memory 610, one or more vehicle sensors 410, and a vehicle self-driving system 620. The charging system 200 can comprise a charging station system controller 640 communicatively coupled to a second memory 645, one or more charging station sensors 405, and one or more charging station servo mechanisms 650.

Referring to FIG. 4, the vehicle 100 can be brought into proximity of the charging station 200, either through the efforts of the driver of the vehicle 100 or by the vehicle self-driving system 620. The vehicle 100 can further comprise a first network interface unit 625 communicatively coupled to the vehicle system controller 605, through which the vehicle system controller 605 can communicate via a network 630 with one or more intelligent agents 635. The network 630 can be a cellular network, the Internet, an Intranet, or other suitable communications network, and can be capable of supporting communication in accordance with any one or more of a number of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth, Wireless LAN (WLAN) protocols/techniques.

The charging station 200 can further comprise a second network interface unit 655 communicatively coupled to the charging station system controller 640, through which the charging station system controller 640 can communicate via the network 630 with the one or more intelligent agents 635, thus allowing communication between the vehicle system controller 605 and the charging station system controller 640.

Each of the vehicle system controller 605 and the charging station system controller 640, according to various embodiments, can comprise a specialized chip, such as an ASIC chip, programmed with logic as described herein to operate the elements of the autonomous system 600. The programmed logic can comprise instructions for operating the vehicle 100 and the charging station 200 in response to one or more inputs.

Continuing with FIG. 4, the vehicle sensors 410 can comprise one or more locational sensors 410 to determine a location of the vehicle 100. The locational sensors 410 can be a global position system (GPS) sensor 410. The locational sensors 410 can also comprise ultrasonic emitters and receivers, magnetometers, cameras or other imaging devices, or the like. The vehicle system controller 605 can communicate the location of the vehicle 100 to the intelligent agent 635. The charging station 200 can comprise one or more sensors 405 that can comprise locational sensors 405 as described above to determine a location of the charging station 200, a location of the charging connector 205, and boundaries of the connection envelope 415. The charging station system controller 640 can communicate the location of the charging station 200, the location of the charging connector 205, and boundaries of the connection envelope 415 to the intelligent agent 635.

The location of the vehicle can be stored in the first memory 610 or in the vehicle sensor 410. The location can be in the form of latitude and longitude coordinates, Universal Transverse Mercator (UTM) coordinates, Military Grid Reference System (MGRS) coordinates, United States National Grid (USNG) coordinates, Global Area Reference System (GARS) coordinates, World Geographic Reference System (GEOREF) coordinates, or any other geographic coordinate system.

The intelligent agent 635, using the location inputs from the vehicle system controller 605 and the charging station system controller 640, can determine one or more movements of the vehicle 100 (e.g., a first travel path indicated by a first arrow A in FIG. 4) to position the charging port 305 within the connection envelope 415. The intelligent agent 635 can communicate the first travel path to the vehicle system controller 605, which can then activate a self-driving mode of the vehicle self-driving system 620. The vehicle self-driving system 620, in conjunction with inputs from the vehicle sensors 410 and, in some embodiments, inputs from the charging station sensors 405, can carry out the first travel path and position the charging port 305 within the connection envelope 415.

Once the vehicle self-driving system 620 carries out the first travel path and brings the vehicle 100 to a stop and deactivates the vehicle self-driving system 620, the vehicle system controller 605 can receive further inputs from the vehicle sensors 410 to verify that the charging port 305 is positioned within the connection envelope 415. The vehicle system controller 605 then communicates the verification to the intelligent agent 635 along with the current location of the charging port 305 in 3-dimensional space within the connection envelope 415. The charging station system controller 640 can receive input from the charging station sensors 405 and determine the location of the charging connector 205 and communicate the location to the intelligent agent 635. The input from the charging station sensors 405 may indicate a location relative to the connection envelope 415. Alternatively, the input from the charging station sensors 405 may indicate a location of the charging connector 205 with respect to other references, such as a global reference system provided by a GPS sensor. The charging station system controller 640 can then determine the location of the charging connector 205 relative to connection envelope 415 based on the input from the charging station sensor 405. The intelligent agent 635 can then determine one or movements of the charging station 200 or portion of the charging station 200 (e.g., a second travel path indicated by arrow B in FIG. 4) to position the charging connector 205 into contact with the charging port 305 within the connection envelope 415. The intelligent agent 635 can communicate the second travel path to the charging station system controller 640, which can then activate the one or more charging station servo mechanisms 650. The charging station servo mechanisms 650, in conjunction with inputs from the charging station sensors 405 and, in some embodiments, inputs from the vehicle sensors 410, can carry out the second travel path and position the charging connector 205 in contact with the charging port 305 within the connection envelope 415.

The vehicle system controller 605 can receive inputs from the vehicle sensors 410, and the charging station system controller 640 can receive inputs from the charging station sensors 405 to verify the connection between the charging connector 205 and the charging port 305. The verification can be communicated to the intelligent agent 635, which can initiate charging of the batteries in the vehicle 100. Once the charging is complete, the vehicle sensors 410 can send a signal to the vehicle system controller 605 verifying the completion of a charging cycle. The vehicle system controller 605 can then communicate the verification to the intelligent agent 635, which can then determine one or more movements (e.g., a third travel path) to move the charging connector 205 away from the charging port 305 and return the charging station 200 to a standby or parked position.

Figure 7A:
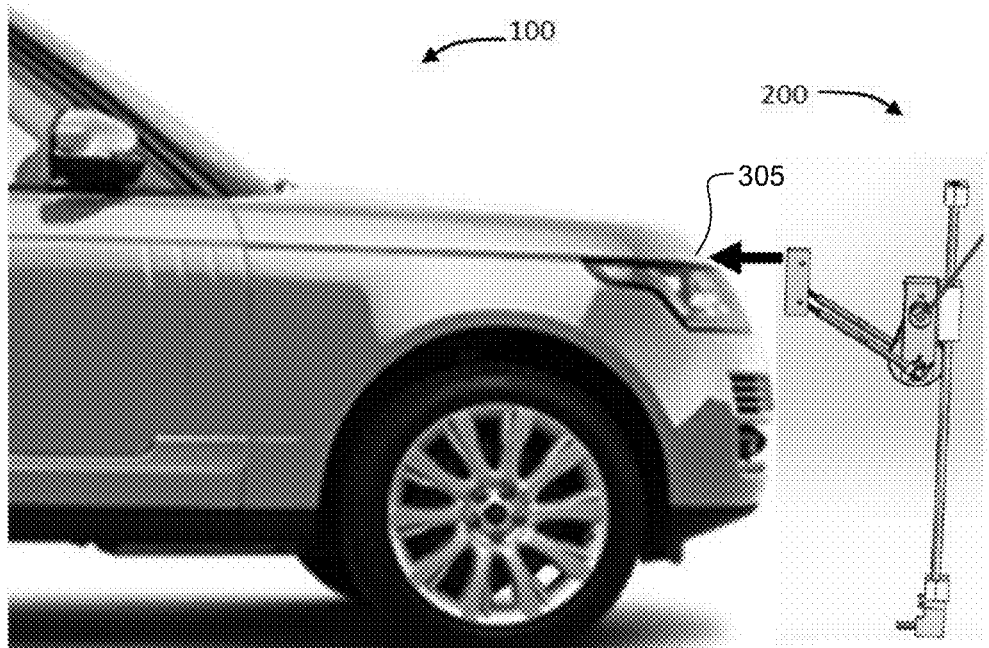
FIG. 7A is a side view of a charging station coupling to a front of a vehicle according to various embodiments.
Figure 7B:
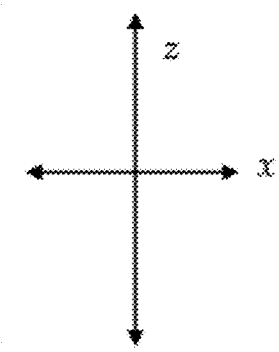
FIG. 7B is a side view of an exemplary charging station coupling to a back of a vehicle according to various embodiments.
Figure 7B:
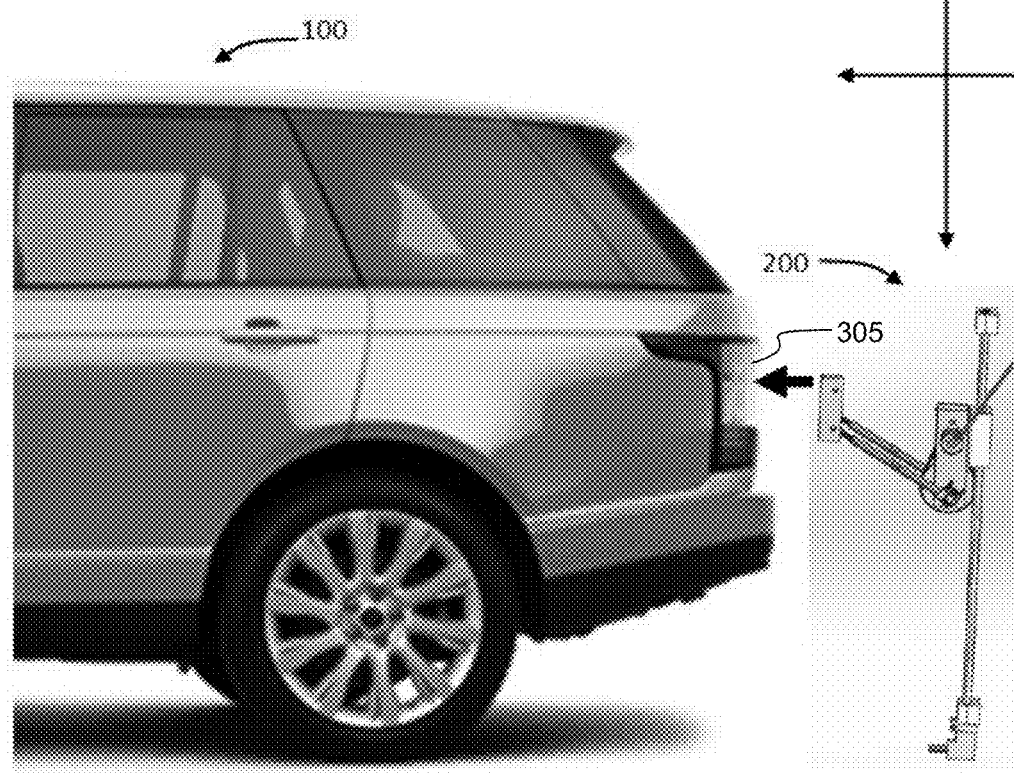

FIGS. 7A and 7B, and FIGS. 8 through 11 illustrate an exemplary charging station 200 according to various embodiments. FIGS. 7A and 7B illustrate that the charging port 305 can be located anywhere on the vehicle 100, such as a front of the vehicle 100 as illustrated in FIG. 7A or a back of the vehicle 100 as illustrated in FIG. 7B. Additionally, the charging port 305 can be positioned on the vehicle 100 at any height along the z-axis so long as the height does not exceed a height of the connection envelope 415 (see FIG. 5).

Figure 8:
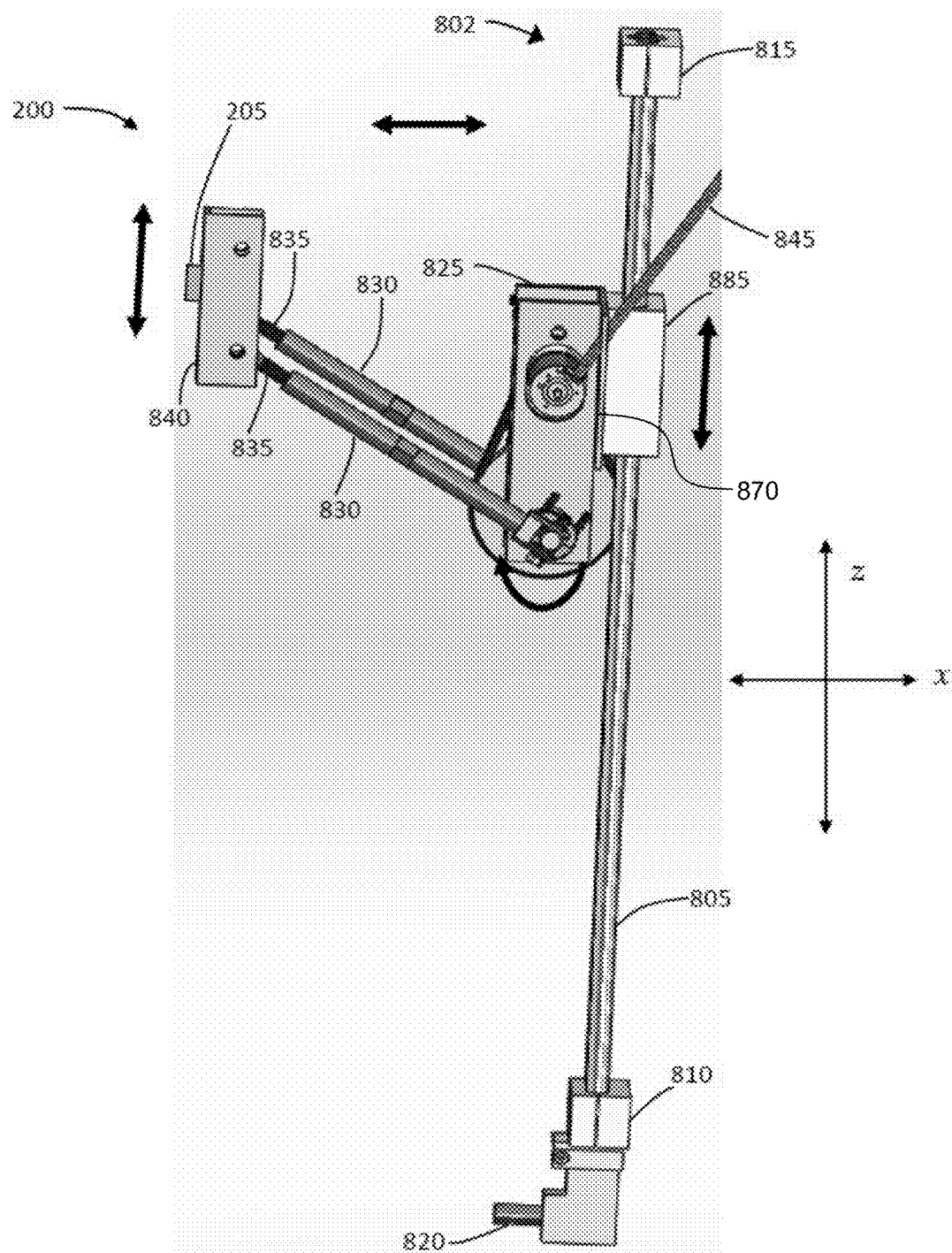
FIG. 8 is a side view of an exemplary charging station illustrating movement in the x-axis and the z-axis according to various embodiments.
Figure 9:
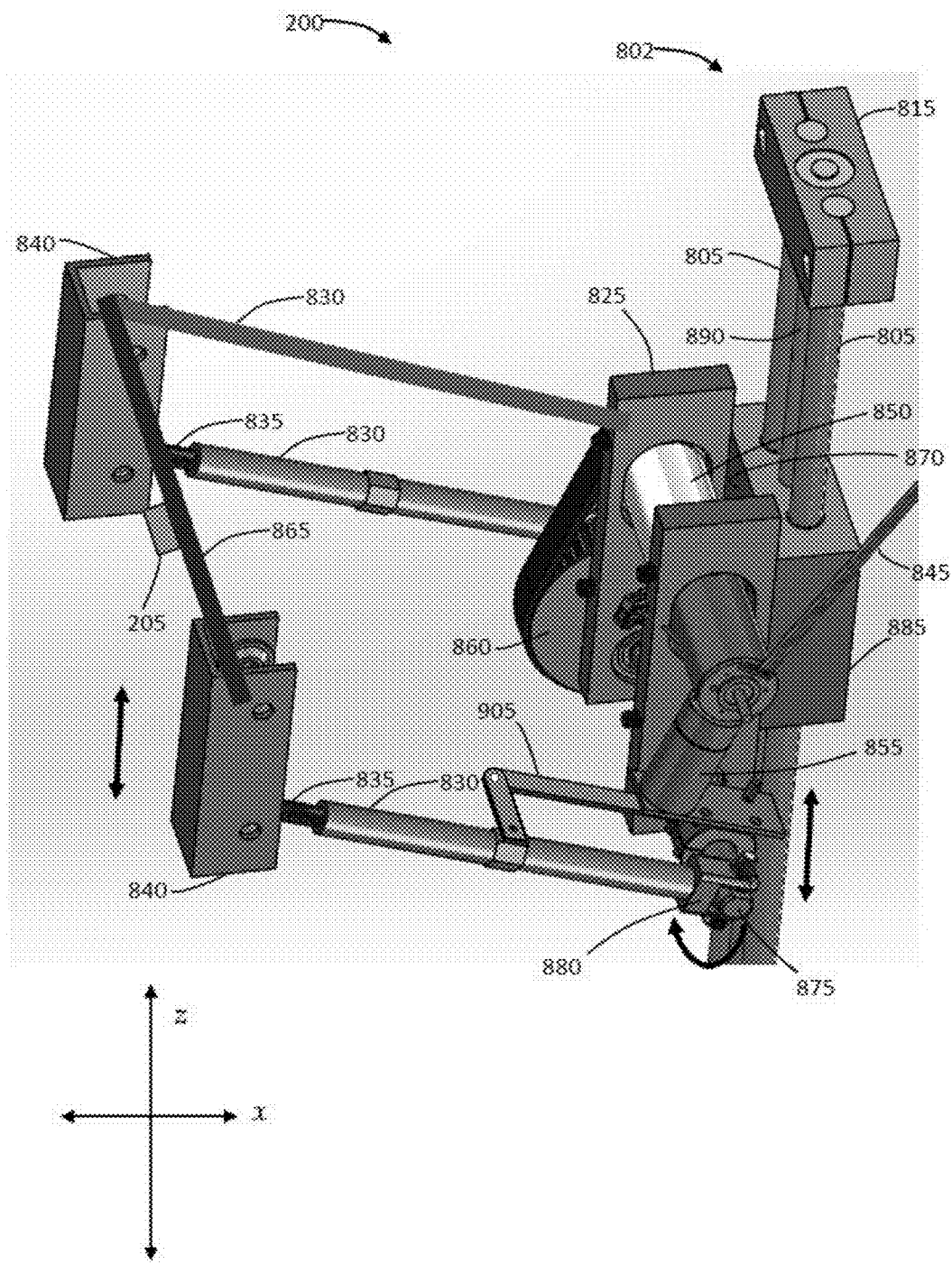
FIG. 9 is a perspective view of an exemplary charging station illustrating movement in the x-axis and the z-axis according to various embodiments.
Figure 10:
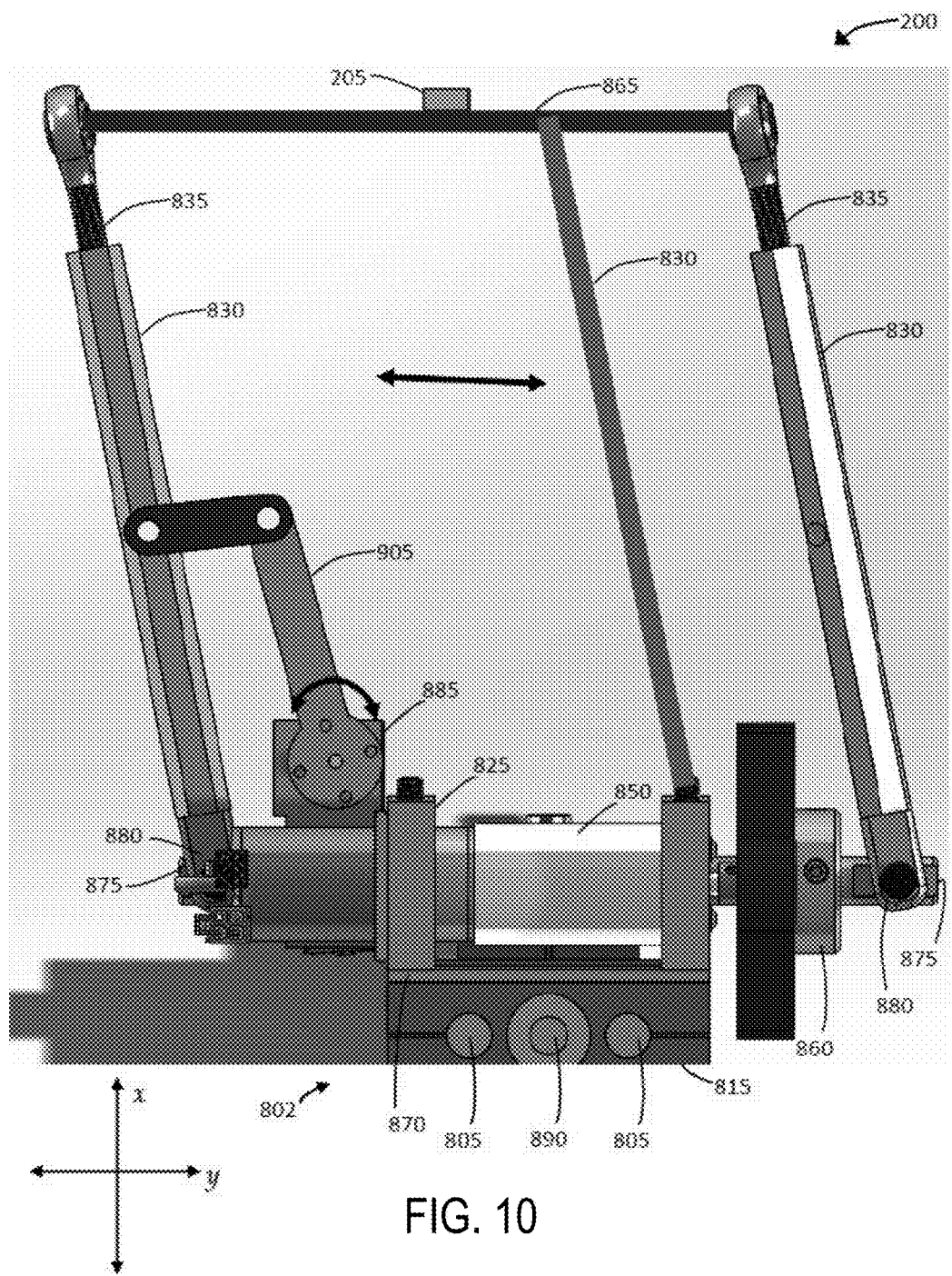
FIG. 10 is a top view of an exemplary charging station illustrating movement in the x-axis and the y-axis according to various embodiments.

Referring now to FIGS. 8 through 10, the exemplary charging station 200 can comprise a mounting system 802 comprising a lower mounting block 810 and an upper mounting block 815 that can be coupled to a wall, post, or other structure for mechanical stability. One or more vertical guide arms 805 can extend between the lower and upper mounting blocks 810, 815. Some embodiments can further comprise a linear actuator 885 riding on the one or more vertical guide arms 805 and driven by a vertical linear actuator shaft 890 to provide movement along the z-axis. The vertical linear actuator shaft 890 can be oriented parallel to the one or more vertical guide arms 805 and held in place by the lower and upper mounting blocks 810, 815. A first plate 870 can be coupled to the linear actuator 885 and can travel along with the linear actuator 885 along the z-axis. The first plate 870 can be oriented in the y-z plane. The mounting system 802 can further comprise a power cable 845 for delivering an electrical current to the charging connector 205.

An actuator unit 825 comprising one or more actuators to affect further movement of the charging unit 200 can be coupled to the first plate 870. The actuator unit 825 comprises a rotatable shaft 875 oriented along the y-axis. Each end of the shaft 875 is coupled to horizontal arms 830 by a pivotable joint 880. The pivotable joints 880 may be clevis joints which use bronze bushings to allow for low sliding friction and low-tolerance moving parts, although it is to be understood that other suitable pivot joints may be used. Horizontal arm lead screws 835 extend outward from an end of each horizontal arm 830 opposite the pivotable joint 880. The lead screws 835 can be driven from within the horizontal arm 830 such that the lead screw 835 is extendable and retractable along an axis of the horizontal arms 830. Each of the lead screws 835 can be coupled to a fixture block 840, and a second plate 865 can be disposed between the fixture blocks 840. The charging connector 205 can be coupled to the second plate 865.

In various embodiments, the actuator unit 825 can comprise a first actuator 850 coupled to a belt and pulley mechanism 860. The pulley can be coupled to a shaft 875 such that when the first actuator 850 moves the belt, the pulley rotates and causes the shaft 875 to rotate. The shaft 875 uses ball bearings for shaft support and low rolling resistance. The rotational movement of the shaft 875 can cause the horizontal arms 830 to move up or down as indicated by the vertical arrow in FIG. 8, thereby changing the position of the charging connector 205 along the z-axis.

The actuator unit 825 can further comprise a second actuator 855 coupled to one of the horizontal arms 830 by a linkage mechanism 905. The second actuator 855 can cause one of the linkages in the linkage mechanism 905 to move in an arc as indicated in FIG. 10. Movement of the linkage mechanism 905 can cause the horizontal arms 830 to move left and right along the y-axis as viewed in FIG. 10.

The charging station 200 can further comprise at least one additional horizontal arm 830 coupled to the actuator unit 825 (or alternatively to the first plate 870) and the second plate 865. As illustrated according to various embodiments in FIG. 9, the third horizontal arm 830 can be positioned parallel to the other horizontal arms 830, but not in the same plane. The third horizontal arm 830 can provide additional structural support and resist twisting of the structure formed by the other two horizontal arms 830 and the second plate 865. The first plate 870 and the second plate 865 are kept parallel by the combination of the horizontal arms 830.

As described previously, the charging station system controller 640 can direct the first and second actuators 850, 855 and the lead screws 835 to initiate movements such that the charging connector 205 is positioned in contact with the charging port 305 when the charging port 305 is positioned within the connection envelope 415.

Figure 11:
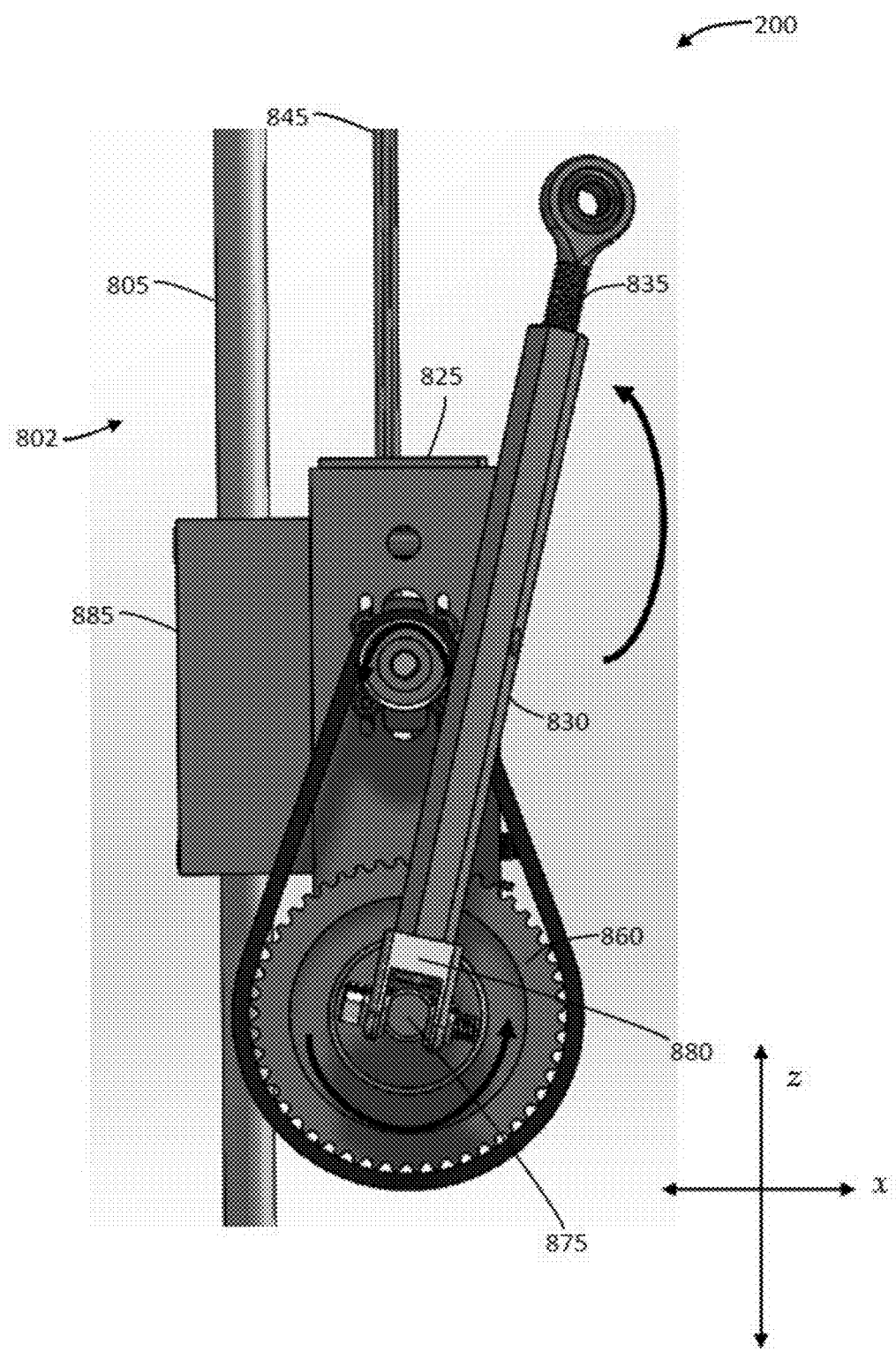
FIG. 11 is a side view of an exemplary charging station in a parked position according to various embodiments.

FIG. 11 illustrates the charging system 200 in a parked or stand-by position where the horizontal arms 305 are rotated by the first actuator 850 to a maximum upward (or alternatively, downward) position. This parked position can allow more unencumbered movement around the charging station 200 when not in use. Power cord 845 can provide electrical power to the actuators 850, 855, the lead screws 835, and the linear actuator 885.

Figure 12:
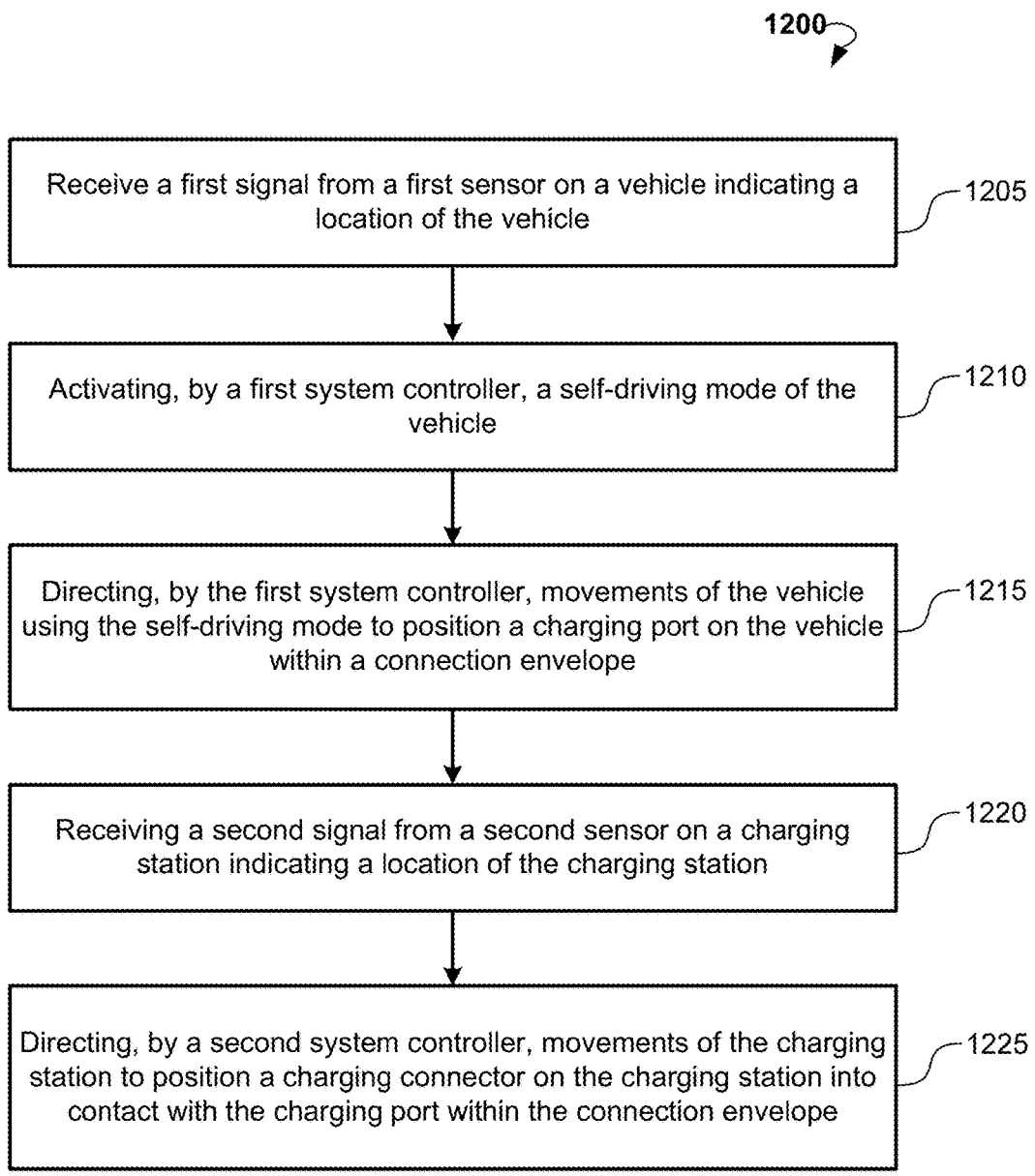
FIG. 12 is a flow diagram of an exemplary method for autonomous connection of a charging station to a vehicle according to various embodiments.

FIG. 12 is a flowchart of an exemplary method 1200 for autonomous connection of a charging station 200 to a vehicle 100 according to various embodiments. At step 1205, a first signal can be received from a first sensor 410 on the vehicle 100. The signal can indicate a location of the vehicle 100. At step 1210, a first system controller 605 can activate a self-driving mode of a vehicle self-driving system 620, and at step 1215 direct movements of the vehicle 100 using the self-driving mode to position a charging port 305 on the vehicle 100 within a connection envelope 415. At step 1220, a second signal can be received from a second sensor 405 on the charging station 200 indicating a location of the charging station 200. A second system controller 640 can direct movements of the charging station 200 to position a charging connector 205 on the charging station 200 into contact with the charging port 350 within the connection envelope 415 at step 1225.

Figure 13:
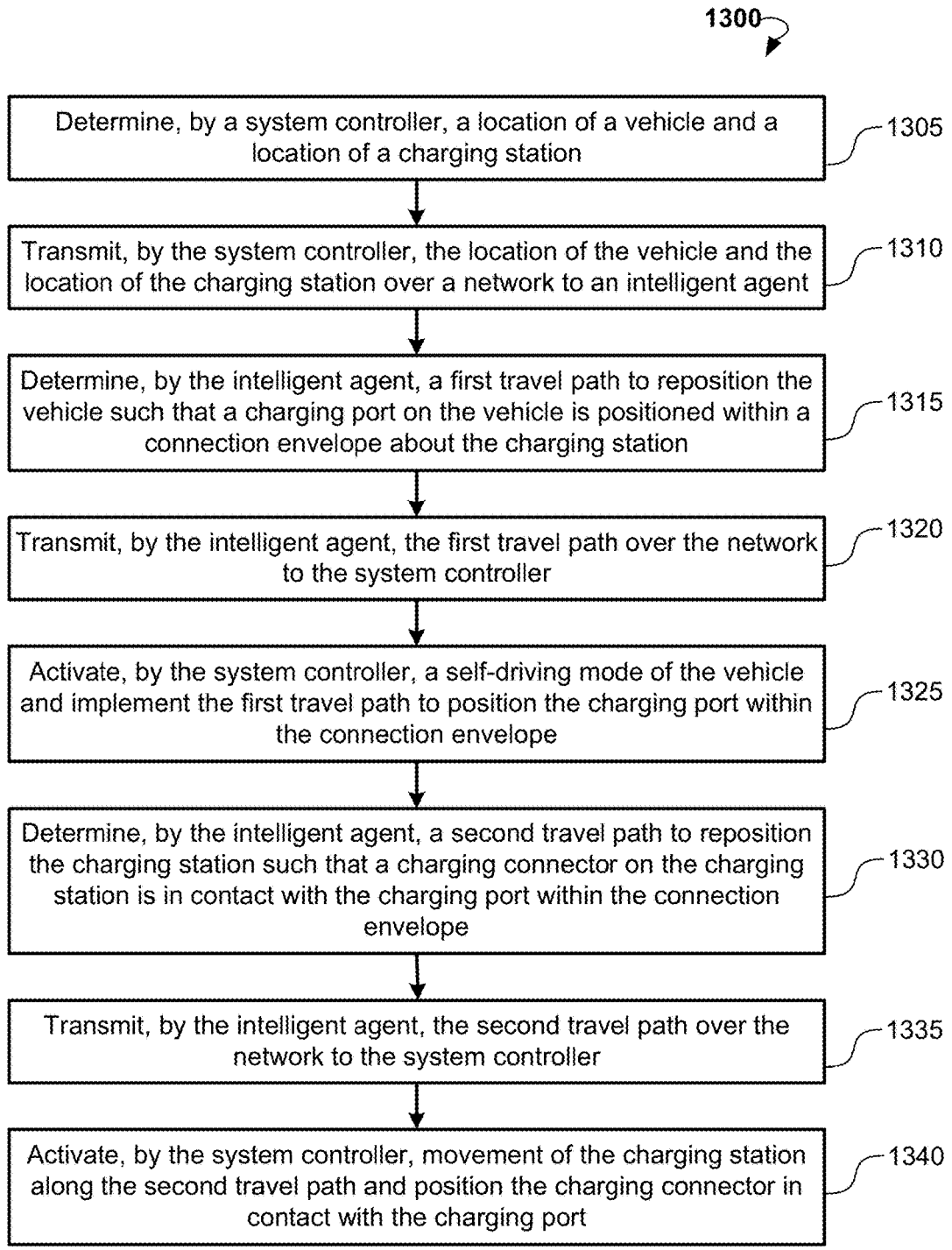
FIG. 13 is another flow diagram of an exemplary method for autonomous connection of a charging station to a vehicle according to various embodiments.

FIG. 13 is a flow chart of an exemplary method 1300 for autonomous connection of a charging station 200 to a vehicle 100 according to various embodiments. At step 1305, a system controller 605 can determine a location of the vehicle 100 and a location of the charging station 200. The system controller 605 can transmit the locations of the vehicle 100 and the charging station 200 over a network 630 to an intelligent agent 635 at step 1310. The intelligent agent 635 can determine at step 1315 a first travel path to reposition the vehicle 100 such that a charging port 305 on the vehicle 100 is positioned within a connection envelope 415 about the charging station 200. At step 1320, the intelligent agent 635 can transmit the first travel path over the network 630 to the system controller 605. At step 1325, the system controller 605 can activate a self-driving mode of a vehicle self-driving system 620 and implement the first travel path to position the charging port 305 within the connection envelope 415. At step 1330, the intelligent agent 635 can determine a second travel path to reposition the charging station 200 such that a charging connector 205 on the charging station 200 is in contact with the charging port 305 within the connection envelope 415. At step 1335, the intelligent agent 635 can transmit the second travel path over the network 630 to the system controller 605. The system controller 605 can activate movement of the charging station 200 along the second travel path and position the charging connector 205 in contact with the charging port 305 within the connection envelope 415 at step 1340.

According to various embodiments, the vehicle system controller 605 and the charging station system controller 640 can communicate with a cloud-based computing environment that collects, processes, analyzes, and publishes datasets. In general, a cloud-based computing environment is a resource that typically combines the computational power of a large grouping of processors and/or that combines the storage capacity of a large group of computer memories or storage devices. For example, systems that provide a cloud resource can be utilized exclusively by their owners, such as Google™ or Amazon™, or such systems can be accessible to outside users who deploy applications within the computing infrastructure to obtain the benefits of large computational or storage resources.

The cloud can be formed, for example, by a network of web servers with each server (or at least a plurality thereof) providing processor and/or storage resources. These servers can manage workloads provided by multiple users (e.g., cloud resource customers or other users). Typically, each user places workload demands upon the cloud that vary in real-time, sometimes dramatically. The nature and extent of these variations typically depend upon the type of business associated with each user.

Some of the above-described functions can be composed of instructions that are stored on storage media (e.g., computer-readable media). The instructions can be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media can be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While the present disclosure has been described in connection with a series of preferred embodiments, these descriptions are not intended to limit the scope of the disclosure to the particular forms set forth herein. The above description is illustrative and not restrictive. Many variations of the embodiments will become apparent to those of skill in the art upon review of this disclosure. The scope of this disclosure should, therefore, be determined not with reference to the above description, but instead should be determined with reference to the appended claims along with their full scope of equivalents. The present descriptions are intended to cover such alternatives, modifications, and equivalents as can be included within the spirit and scope of the disclosure as defined by the appended claims and otherwise appreciated by one of ordinary skill in the art. In several respects, embodiments of the present disclosure can act to close the loopholes in the current industry practices in which good business practices and logic are lacking because it is not feasible to implement with current resources and tools.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

What is claimed is:

1. A method for autonomous connection of a charging station to a vehicle, the method comprising:
    activating one or more locational sensors on the vehicle;
    analyzing data generated by the one or more locational sensors to determine a location of the vehicle;
    sending a first signal from a first sensor of the one or more locational sensors to an intelligent agent, the first signal indicating a location of the vehicle;
    determining, using the intelligent agent, a first travel path of the vehicle based on the first signal;
    communicating the first travel path from the intelligent agent to the vehicle;
    activating one or more locational sensors on the charging station;
    analyzing data generated by the one or more locational sensors on the charging station to determine a location of the charging station;
    sending a second signal from a second sensor of the one or more locational sensors on the charging station to the intelligent agent, the second signal indicating a location of the charging station;
    determining, using the intelligent agent, a second travel path based on the second signal; and
    communicating the second travel path from the intelligent agent to the charging station;
    moving the vehicle along the first travel path to position a charging port on the vehicle within a connection envelope; and
    moving the charging connector along the second travel path to position a charging connector on the charging station into contact with the charging port within the connection envelope.

2. The method of claim 1, wherein receiving the first signal from the first sensor on the vehicle comprises receiving the first signal from an on-board global positioning system.

3. The method of claim 1, wherein the one or more locational sensors comprises at least one of ultrasonic sensors, magnetometers, and cameras.

4. The method of claim 1, wherein activating the one or more locational sensors comprises activating at least one of ultrasonic sensors, magnetometers, and cameras.

5. The method of claim 1, wherein the connection envelope is defined by maximum movements of the charging station along an x-axis, a y-axis, and a z-axis.

* * * * *